United States Patent [19]

Weber et al.

[11] Patent Number: 5,178,790

[45] Date of Patent: Jan. 12, 1993

[54] SUPERTWIST LIQUID CRYSTAL DISPLAY

[75] Inventors: Georg Weber, Erzhausen; Herbert Plach, Darmstadt; Volker Reiffenrath, Rossdorf; Reinhard Hittich, Modautal, all of Fed. Rep. of Germany

[73] Assignee: Merck Patent Gesellschaft mit Beschraenkter Haftung, Darmstadt, Fed. Rep. of Germany

[21] Appl. No.: 359,666

[22] PCT Filed: Feb. 27, 1989

[86] PCT No.: PCT/EP89/00178

§ 371 Date: May 15, 1989

§ 102(e) Date: May 15, 1989

[87] PCT Pub. No.: WO89/08691

PCT Pub. Date: Sep. 21, 1989

[30] Foreign Application Priority Data

Mar. 10, 1988 [DE] Fed. Rep. of Germany ....... 3807805
Oct. 20, 1988 [DE] Fed. Rep. of Germany ....... 3835803

[51] Int. Cl.$^5$ .................... C09K 19/52; C09K 19/30; C09K 19/20

[52] U.S. Cl. .......................... 252/299.01; 252/299.63; 252/299.67

[58] Field of Search ................... 252/299.01, 299.62, 252/299.63, 299.66, 299.67, 299.68

[56] References Cited

U.S. PATENT DOCUMENTS

| 4,368,135 | 1/1983 | Osman | 252/299.63 |
| 4,415,470 | 11/1983 | Eidenschink et al. | 252/299.63 |
| 4,514,317 | 4/1985 | Tuong et al. | 252/299.62 |
| 4,545,922 | 10/1985 | Eidenschink et al. | 252/299.63 |
| 4,551,264 | 11/1985 | Eidenschink et al. | 252/299.62 |
| 4,602,851 | 7/1986 | Jenner et al. | 252/299.63 |
| 4,606,845 | 8/1986 | Romer et al. | 252/299.63 |
| 4,637,897 | 1/1987 | Kelly | 252/299.63 |
| 4,659,502 | 4/1987 | Fearon et al. | 252/299.61 |
| 4,664,840 | 5/1987 | Osman | 252/299.63 |
| 4,710,315 | 12/1987 | Schad et al. | 252/299.63 |
| 4,724,097 | 2/1988 | Romer et al. | 252/299.63 |
| 4,776,973 | 10/1988 | Bofinger et al. | 252/299.61 |
| 4,778,620 | 10/1988 | Goto et al. | 252/299.63 |
| 4,797,228 | 1/1989 | Goto et al. | 252/299.63 |
| 4,799,774 | 1/1989 | Baur et al. | 350/346 |
| 4,820,839 | 4/1989 | Krause et al. | 252/299.61 |
| 4,834,904 | 5/1989 | Krause et al. | 252/299.01 |
| 4,886,344 | 12/1989 | Scheuble et al. | 350/350 R |
| 4,897,216 | 1/1990 | Reiffenrath et al. | 252/299.63 |
| 4,925,278 | 5/1990 | Buchecker et al. | 252/299.01 |
| 4,925,590 | 5/1990 | Reiffenrath et al. | 252/299.61 |
| 5,087,764 | 2/1992 | Reiffenrath et al. | 568/656 |

FOREIGN PATENT DOCUMENTS

| 0051738 | 3/1981 | European Pat. Off. |
| 0098070 | 1/1984 | European Pat. Off. |
| 0133489 | 7/1984 | European Pat. Off. |
| 0131216 | 1/1985 | European Pat. Off. |
| 0246842 | 11/1987 | European Pat. Off. |
| 3503259A1 | 1/1985 | Fed. Rep. of Germany |
| WO88/02130 | 3/1988 | World Int. Prop. O. |

OTHER PUBLICATIONS

Martin Schadt and Frans Leenhouts, "Electro-optical performance of a new, Black-White and Highly Multiplexable Liquid Crystal Display" Appl. Phys. Lett., vol. 50, No. 5, Feb. 2, 1987, pp. 236–241.

E. P. Raynes, "The Theory of Supertwist Transition"; Mol Cryst. Liq. Cryst. Letters. vol. 4(1) pp. 1–8.

Kazunori Katoh et al. "Application of Retardation Compensation; A New Highly Multiplexable Black–White Liquid Crystal Display with Two Supertwist Nematic Layers"; Japanese Journal of Applied Physics, vol. 26, No. 11, Nov. 1987, pp. L17784–L1786.

T. J. Scheffer and J. Nehring; "A New, Highly Multiplexable Liquid Crystal Display"; App. Phys. Lett 45(10, Nov. 15, 1984; 0003-6951/84; pp. 1021–1025.

F. Leehouts, M. Schadt, H. J. Fromm, "Electro-optical Characteristics of a New Liquid–Crystal Display with an Improved Gray-Scale Capability".

Primary Examiner—Robert L. Stoll
Assistant Examiner—Shean C. Wu
Attorney, Agent, or Firm—Millen, White, Zelano and Branigan

[57] ABSTRACT

Supertwist liquid crystal display elements with excellent steepness of the characteristic are obtained, if the nematic liquid crystal mixture satisfies the following conditions:

a nematic phase range of at least 60° C., a viscosity of 30 mPa.s or lower, and $\Delta\epsilon/\epsilon\perp < 2.0$, where $\Delta\epsilon$ is the dielectric anisotropy and $\epsilon\perp$ is the dielectric constant in the direction of the short axis of the liquid crystal molecules.

17 Claims, No Drawings

SUPERTWIST LIQUID CRYSTAL DISPLAY

BACKGROUND OF THE INVENTION

The invention relates to a supertwist liquid crystal display with
- two plane-parallel carrier plates which, with a bordering, form a cell,
- a nematic liquid crystal mixture, located in the cell, having a positive dielectric anisotropy and at least one chiral doping material,
- electrode layers with superposed orientation layers on the insides of the carrier plates,
- a tilt angle of about 1° to 30° between the longitudinal axis of the molecules at the surface of the carrier plates and the carrier plates, and
- a twist angle of the liquid crystal mixture in the cell from orientation layer to orientation layer of an amount between 160° and 450°, characterized in that the nematic liquid crystal mixture satisfies the following conditions:
- a nematic phase range of at least 60° C.,
- a viscosity of 30 mPa.s or lower, and
- $\Delta\epsilon/\epsilon\perp < 2.0$, where $\Delta\epsilon$ is the dielectric anisotropy and $\epsilon\perp$ is the dielectric constant in the direction of the short axis of the liquid crystal molecule.

Supertwist liquid crystal displays (SLC displays) according to the preamble are known, for example from EP 0,131,216 B1; DE 3,423,993 A1; EP 0,098,070 A2; M. Schadt and F. Leenhouts, 17th Freiburger Arbeitstagung Flussigkristalle [Freiburg Working Meeting on Liquid Crystals] (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, volume 26, No. 11, L 1784-L-1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters volume 4 (1), pages 1-8 (1986). The term SLC display here comprises any more highly twisted display with an amount of twist angle between 160° and 360°, such as, for example, the displays according to Waters et al. (C. M. Waters et al., Proc. Soc. Inf. Disp. (New York) (1985) (3rd Intern. Display Conference, Kobe, Japan), the STN-LCD's (German Offenlegungsschrift 3,503,259), SBE-LCD's (T. J. Scheffer and J. Nehring, Appl. Phys. Lett. 45 (1984) 1021), OMI-LCD's (M. Schadt and F. Leenhouts, Appl. Phys. Lett. 50 (1987), 236, DST-LCD's (European Published Application 0,246,842) or BW-STN-LCD's (K. Kawasaki et al., SID 87 Digest 391 (20.6)).

Compared with standard twisted nematic displays, displays of this type are distinguished by substantially better steepness of the electro-optical characteristic and thus associated better contrast values and by a substantially smaller angle dependence of the contrast. Supertwist displays with a very high steepness of the characteristic are here of particular interest. The measure taken for the steepness of the characteristic is in general the ratio $V_{50}/V_{10}$ ($V_{50}$ = voltage at 50% contrast/$V_{10}$ = voltage at 10% contrast). To achieve high steepnesses of the characteristics, especially the elastic properties of the liquid crystal mixture have hitherto been optimized. However, the steepnesses achieved were not adequate for some applications.

SUMMARY OF THE INVENTION

There is thus still a great demand for SLC displays with very high steepnesses of the characteristics coupled with, at the same time, a wide range of working temperature, short switching times and low threshold voltage.

The invention is based on the object of providing SLC displays which show the above-indicated disadvantages only to a smaller extent or not at all and, at the same time, have very high steepnesses of the characteristics.

It has now been found that this object can be achieved if, in these displays, nematic liquid crystal mixtures are used which satisfy the following conditions:
- a nematic phase range of at least 60° C.,
- a viscosity of 30 mPa.s or lower, and
- $\Delta\epsilon/\epsilon\perp < 2.0$, where $\Delta\epsilon$ is the dielectric anisotropy and $\epsilon\perp$ is the dielectric constant in the direction of the short axis of the liquid crystal molecules.

The subject of the invention is thus a supertwist liquid crystal display with
- two plane-parallel carrier plates which, with a bordering, form a cell,
- a nematic liquid crystal mixture, located in the cell, having a positive dielectric anisotropy and at least one chiral doping material,
- electrode layers with superposed orientation layers on the insides of the carrier plates,
- a tilt angle of about 1° to 30° between the longitudinal axis of the molecules at the surface of the carrier plates and the carrier plates, and
- a twist angle of the liquid crystal mixture in the cell from orientation layer to orientation layer of an amount between 160° and 450°, characterized in that the nematic liquid crystal mixture satisfies the following conditions:
- a nematic phase range of at least 60° C.,
- a viscosity of 30 mPa.s or lower, and
- $\Delta\epsilon/\epsilon\perp < 2.0$, where $\Delta\epsilon$ is the dielectric anisotropy and $\epsilon\perp$ is the dielectric constant in the direction of the short axis of the liquid crystal molecules.

Further subjects of the invention are corresponding preferred displays, which satisfy the following conditions:
- the product of the birefringence $\Delta n$ and the layer thickness of the liquid crystal mixture is between 0.1 μm and 2.5 μm,
- the dielectric constant $\epsilon\perp$ is greater than or equal to 4, preferably greater than or equal to 5,
- the dielectric anisotropy $\Delta\epsilon$ is greater than or equal to 5,
- the liquid crystal mixture contains at least one 1,4-disubstituted 2,3-difluorobenzene compound,
- the 2,3-difluorobenzene compound contains a 4-substituted 2,3-difluorophenoxy group,
- the 2,3-difluorobenzene compound is a compound of the formula I

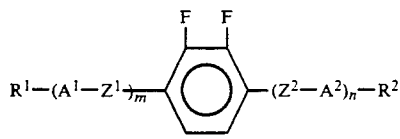

wherein
R¹ and R² each independently of one another are alkyl having 1 to 15 C atoms or alkenyl having 3 to 15 C atoms, it also being possible for one CH₂ group in each of these radicals to be replaced by —O—, —CO—, —CO—O— or —O—CO—, and one of the radicals R¹ and R² can also be F, Cl, CN, NCS, CF₃ or OCF₃, A¹ and A² each independently of one another are
  a) trans-1,4-cyclohexylene, in which one or two non-adjacent CH₂ groups can also be replaced by —O— and/or —S—,
  b) 1;4-phenylene, in which one or two CH groups can also be replaced by N, or
  c) a radical from the group comprising 1,4-bicyclo(2,2,2)octylene and 1,4-cyclohexenylene,
  it being possible for the radicals b) to be mono- or poly-substituted by fluorine, Z¹ and Z² each independently of one another are —CO—O—, —O—CO—, —CH₂O—, —OCH₂—, —CH₂CH₂— or a single bond, m and n each independently of one another are 0, 1 or 2, and (m+n) is 1,2 or 3 the liquid crystal mixture contains at least one liquid-crystalline compound with the structural element

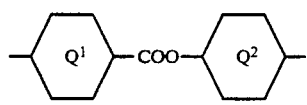

wherein Q¹ and Q² independently of one another are trans-1,4-cyclohexylene, 1,4-phenylene, 2-fluoro-1,4-phenylene, 3-fluoro-1,4-phenylene or 2,3-difluoro-1,4-phenylene, the liquid crystal mixture contains at least one compound of the following formulae A to G:

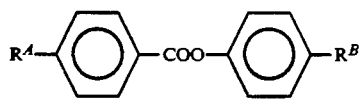

A

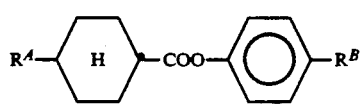

B

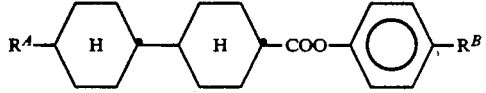

C

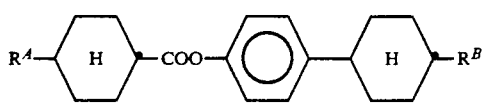

D

-continued

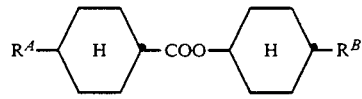

E

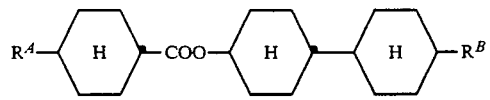

F

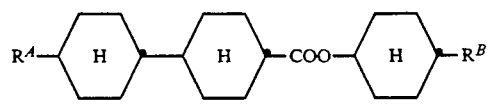

G wherein $R^A$ and $R^B$ each independently of one another are alkyl having 1 to 15 C atoms or alkenyl having 3 to 15 C atoms, it also being possible for one CH₂ group in each of these radicals to be replaced by —O—, —CO—, —CO—O— or —O—CO—, the liquid crystal mixture contains at least one compound of the following formulae H to K:

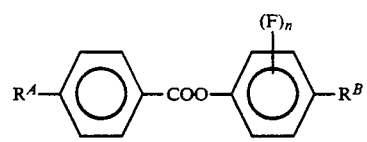

H

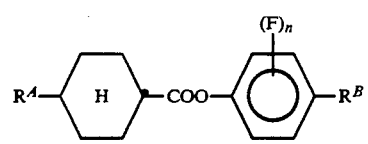

I

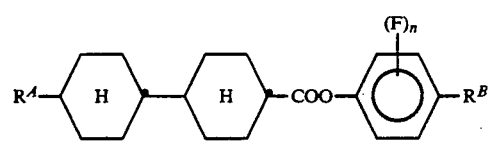

K wherein n is 1 or 2 and, in the case of n=2, the two fluorine atoms are adjacent, and $R^A$ and $R^B$ have the meaning given above, the liquid crystal mixture contains at least one liquid-crystalline tolane compound with the structural element

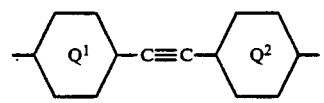

wherein Q¹ and Q² independently of one another are 1,4-phenylene, 2-fluoro-1,4-phenylene, 3-fluoro-1,4-phenylene or 2,3-difluoro-1,4-phenylene, the liquid crystal mixture contains at least one compound of the following formulae L to Q:

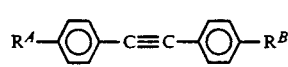

L

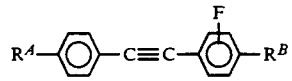

M

-continued

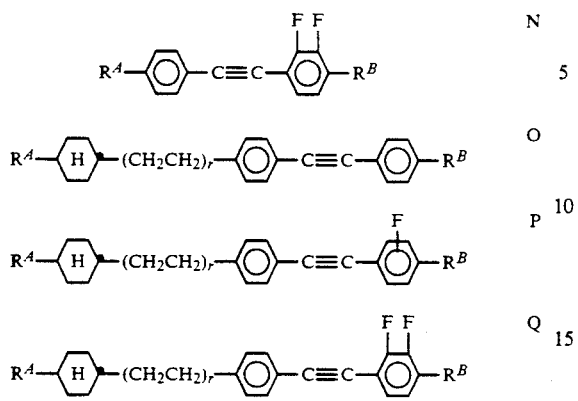

N
O
P
Q wherein $R^A$ and $R^B$ each independently of one another are alkyl having 1 to 15 C atoms or alkenyl having 3 to 15 C atoms, it also being possible for one $CH_2$ group in each of these radicals to be replaced by —O—, —CO—, —CO—O— or —O—CO—, the liquid crystal mixture contains at least one compound of the following formulae R and/or S:

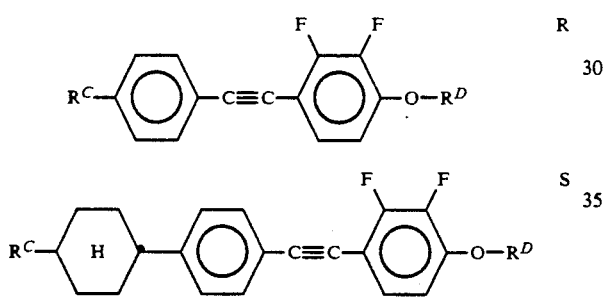

R
S wherein $R^C$ and $R^D$ each independently of one another are n-alkyl having 1 to 10 C atoms or (trans)-n-alkenyl having 3 to 10 C atoms, the liquid crystal mixture contains an ethyne compound of the formula II

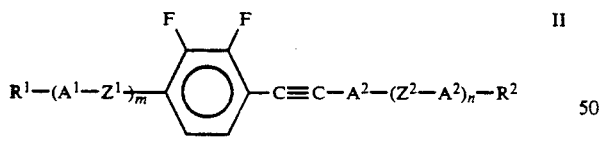

II wherein
$R^1$ and $R^2$ each independently of one another are alkyl having 1 to 15 C atoms or alkenyl having 3 to 15 C atoms, it also being possible for one $CH_2$ group in each of these radicals to be replaced by —O—, —CO—, —CO—O— or —O—CO—, and one of the radicals $R^1$ and $R^2$ can also be F, Cl, CN, NCS, $CF_3$ or $OCF_3$, $A^1$ and $A^2$ each independently of one another are
  a) trans-1,4-cyclohexylene, in which one or two non-adjacent $CH_2$ groups can also be replaced by —O— and/or —S—,
  b) 1,4-phenylene, in which one or two CH groups can also be replaced by N, or
  c) a radical from the group comprising 1,4-bicyclo(2,2,2)octylene and 1,4-cyclohexenylene, it being possible for the radicals b) to be mono- or poly-substituted by fluorine, $Z^1$ and $Z^2$ each independently of one another are —CO—O—, —O—CO—, —$CH_2$O—, —O$CH_2$—, —$CH_2CH_2$— or a single bond, and m and n each independently of one another are 0 or 1, the liquid crystal mixture contains at least one liquid-crystalline compound with the structural element

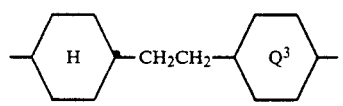

wherein $Q^3$ is trans-1,4-cyclohexylene, 1,4-phenylene, 2-fluoro-1,4-phenylene, 3-fluoro-1,4-phenylene or 2,3-difluoro-1,4-phenylene, the liquid crystal mixture contains at least one compound of the following formulae E1 to E7:

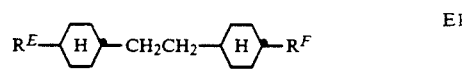

E1

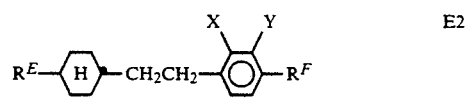

E2

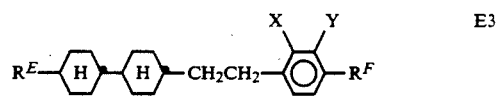

E3

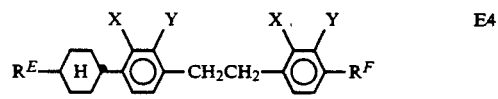

E4

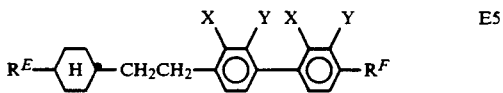

E5

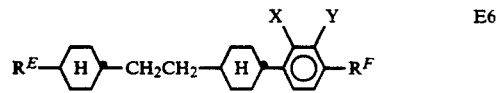

E6

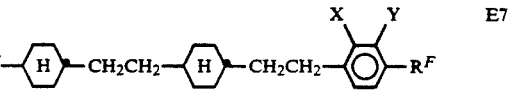

E7 wherein each $R^E$ is an n-alkyl having 1 to 10 C atoms or (trans)-n-alkenyl having 3 to 10 C atoms, $R^F$ is n-alkyl having 1 to 10 C atoms, n-alkoxy having 1 to 10 C atoms, (trans)-n-alkenyl having 3 to 10 C atoms, F or CN, and X and Y each independently of one another are H or F, the liquid crystal mixture contains at least one compound of the formulae E3 to E7, the liquid crystal mixture contains at least one compound of the formulae E3 to E7, wherein $R^F$ is n-alkyl or n-alkenyl and X and Y are each H, the liquid crystal mixture contains at least one compound of the formulae E3 to E7, wherein $R^F$ is fluorine, X is H and Y is H or fluorine, the liquid crystal mixture contains at least one compound of the formulae E3 to E7, wherein $R^F$ is cyano.

The invention further relates to the use of nematic liquid crystal mixtures which satisfy the following conditions:

a nematic phase range of at least 60° C., a viscosity of 30 mPa.s or lower, and $\Delta\epsilon/\epsilon\perp < 2.0$, where $\Delta\epsilon$ is the dielectric anisotropy and $\epsilon\perp$ is the dielectric constant in the direction of the short axis of the liquid crystal molecules, as the dielectrics of SLC displays.

Finally, the invention also relates to corresponding liquid crystal mixtures for use in SLC displays.

Nematic liquid crystal mixtures which satisfy two of the three indicated conditions are known and are commercially exploited in many diverse embodiments. It is also known that $\Delta\epsilon/\epsilon\perp$ values of <2.0 can be realized by the use of high proportions of phenyl benzoates according to German Patent Specification 2,167,252 or of the dielectrically strongly negative liquid crystals (for example corresponding to German Offenlegungsschrift 3,231,707). However, these liquid crystal mixtures are characterized by high viscosities, the values at 20° frequently being between 40 and 50 mPa.s or higher. Corresponding SLC displays thus have switching times which are markedly too long for commercial application.

However, the liquid crystal mixtures according to the invention make it possible to reach a low $\Delta\epsilon/\epsilon\perp$ value at the same time as low viscosities, so that excellent steepnesses of the electro-optical characteristic can be achieved in SLC displays. The liquid crystal mixtures according to the invention preferably have $\epsilon\perp \geq 4$, especially $\epsilon\perp \geq 5$ or $\geq 6$. $\Delta\epsilon/\epsilon\perp$ is preferably <1.5, in particular $\leq 1.3$. However, especially by means of the compounds of formula I, $\Delta\epsilon/\epsilon\perp$ values of $\leq 1.1$ or even $\leq 0.9$ can also be reached. Such embodiments are likewise preferred. The viscosity at 20° C. is preferably $\leq 25$ mPa.s. The nematic phase range is preferably at least 70°, in particular at least 80°. Preferably, this range extends at least from $-20°$ to $+70°$.

To achieve the required $\Delta\epsilon/\epsilon\perp$ values, the mixtures according to the invention preferably contain 5–60 % of one or more compounds having a dielectric anisotropy of less than $-2.0$. Preferably, this proportion is >20%, in particular 25–40%. The viscosity of these compounds is preferably 10 to 50 mPa.s at 20° C.

The individual compounds of the formulae I, II, A to Q and E1 to E7, which can be used in the SLC displays according to the invention, are either known or can be prepared analogously to the known compounds.

Preferred liquid crystal mixtures, which can be used according to the invention, contain in total preferably 5–60%, especially 10–40%, of compounds of the formula I. Those liquid crystal mixtures are particularly preferred which, in addition to dielectrically negative compounds of formula I, also contain at least one compound of the formula I with positive dielectric anisotropy (wherein one of the radicals $R^1$ and $R^2$ is F, Cl, CN, NCS, $CF_3$ or $OCF_3$, preferably CN or F). They contain in total preferably 10–30 components, especially 12–20 components. Those liquid crystal mixtures are particularly preferred which contain known liquid-crystalline esters of p-fluorophenol and/or liquid-crystalline tolane derivatives. The latter are distinguished by a high birefringence and high $K_3/K_1$ values. The use of tolane derivatives makes it possible to change over to SLC displays with small layer thicknesses (about 5 to 6 μm), whereby markedly shorter switching times result.

The proportion of the tolan derivatives is preferably 5% to 35%, particularly preferably 10% to 30%. Preferred tolan derivatives are indicated below:

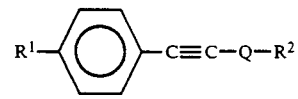

T1

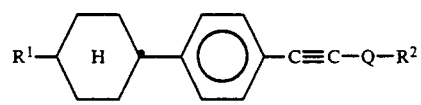

T2

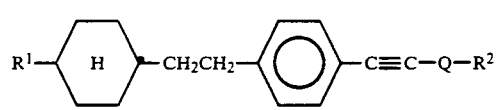

T3 wherein $R^1$ and $R^2$ have the meanings given under formula I. $R^1$ is preferably n-alkyl having 1 to 7 C atoms or n-alkenyl having 3 to 7 C atoms. $R^2$ is preferably n-alkoxy or n-alkyl each having 1 to 7 C atoms or n-alkenyl or n-alkenyloxy each having 3 to 7 C atoms. Q is 1,4-phenylene, 2-fluoro-1,4-phenylene, 3-fluoro-1,4-phenylene or 2,3-difluoro-1,4-phenylene. Preferably, the mixtures according to the invention contain one or more compounds of the formulae T1, T2 and T3, wherein Q is 2-fluoro-1,4-phenylene, 3-fluoro-1,4-phenylene or 2,3-difluoro-1,4-phenylene, and particularly preferably 2,3-difluoro-1,4-phenylene.

The components of the formulae I and/or II, required for achieving small $\Delta\epsilon/\epsilon\perp$ values, are described in the following German Offenlegungsschriften 3,807,801, 3,807,861, 3,807,863, 3,807,864 and 3,807,908 and in the International Patent Application PCT/DE 88/00,133. Preferably, the proportion of these compounds is selected such that $\epsilon\perp$ of the complete mixture is at least 4.0, preferably at least 5.0. The compounds of the formulae I and II are ideally suitable for this purpose, since the viscosity of the complete mixture remains surprisingly low as a result of their addition, whereas dielectrically strongly negative compounds from the state of the art such as, for example, derivatives of 2,3-dicyanohydroquinone or cyclohexane derivatives with the structural element

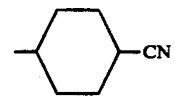

lead in many cases to a viscosity increase which is not acceptable.

Preferably, a mixture contains one or more dielectrically negative compounds ($\Delta\epsilon < -1.5$) which at the same time has a high optical anisotropy ($\Delta n > 0.15$). Preferably, compounds of the formula II are used.

Preferably, the mixtures according to the invention contain ester compounds with the structural element

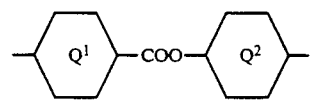

wherein $Q^1$ and $Q^2$ independently of one another are trans-1,4-cyclohexylene, 1,4-phenylene, 2- or 3-fluoro-1,4-phenylene or 2,3-difluoro-1,4-phenylene. The latter represent preferred compounds of the formula I.

Those mixtures are particularly preferred which contain one or more ester compounds of the formulae A to G, compounds of formulae B, C, D and E being particularly preferred. Further preferred ester compounds are those of the formulae

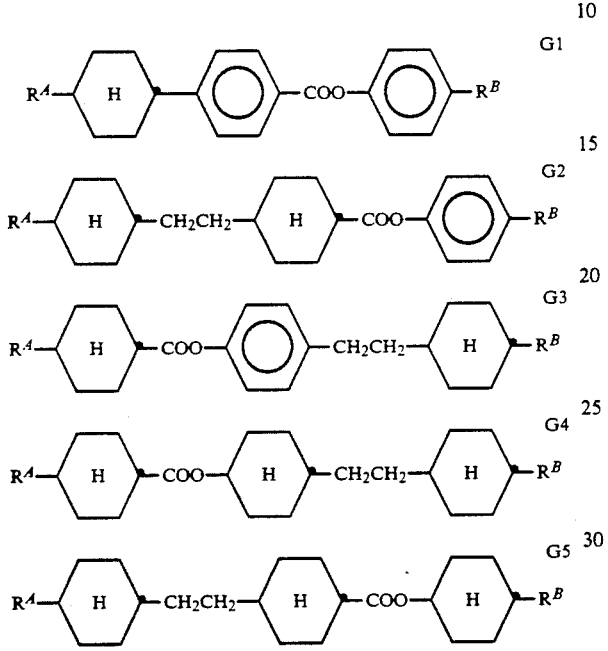

wherein $R^A$ and $R^B$ have the meaning given under the formulae A to G. G1 is particularly preferred. The proportion of these ester compounds can be up to about 60%, in particular about 10% to 40%.

In a particularly preferred embodiment, the mixtures contain one or more compounds with the structural element

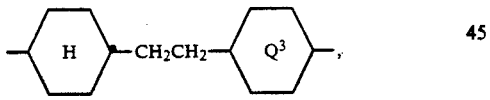

wherein $Q^3$ is trans-1,4-cyclohexylene, 1,4-phenylene, 2- or 3-fluoro-1,4-phenylene or 2,3-difluoro-1,4-phenylene. The latter represent preferred compounds of the formula I. The proportion of these compounds is preferably 10% to 45%, particularly preferably about 10% to 35%. The compounds of the formulae E1 to E7 are particularly preferred, and amongst these in particular E3 and E6.

The mixtures according to the invention contain one or more compounds with $\Delta\epsilon > 1.5$. The selection of these compounds, of which a large number is known, is not critical. The person skilled in the art can, without an inventive step, fix the nature and proportion of these compounds for obtaining the desired threshold voltage. The proportion is preferably about 30% to 70%, particularly preferably 40% to 60%. Preferably, dielectrically positive compounds of the formula I and/or II (one of the radicals $R^1$ and $R^2$ is F, CN, $CF_3$ or $OCF_3$) are also used in addition to conventional components such as, for example,

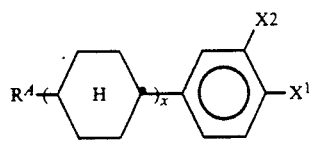
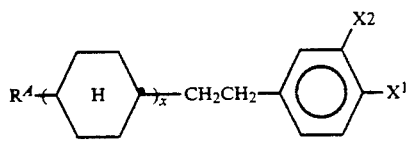
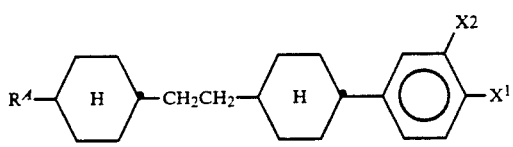
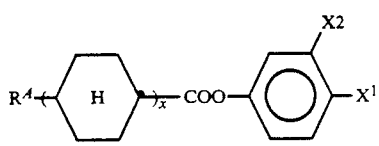
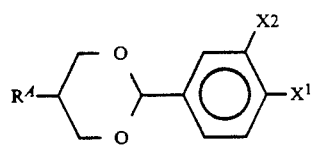
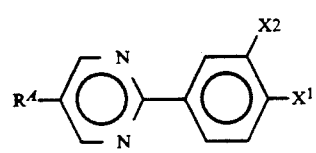
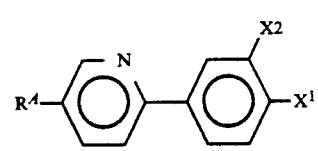
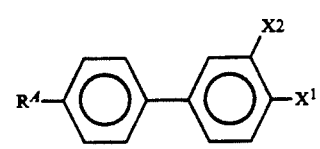

wherein $R^A$ is the meaning given under the formulae A to G, x is 1 or 2, $X^1$ is CN or F and $X^2$ is H or F.

The selection of the chiral doping materials is not in itself critical. A person skilled in the art can, without an inventive step, fix the nature and quantity of the chiral component for obtaining the desired ratio of layer thickness to natural pitch in the complete mixture (for example between 0.3 and 1.3).

In addition to very good steepnesses of the characteristics, the displays according to the invention also show a particularly small angle dependence of the contrast, that is to say the value $$\beta = \frac{V_{10/10/20} - V_{10/45/20}}{\frac{1}{2}(V_{10/10/20} + V_{10/45/20})} \cdot 100\%$$

is particularly small.

At the same time, the mixtures according to the invention show advantageous elastic properties, that is to say especially for $K_3/K_1$.

In the displays according to the invention, having a twist angle of an amount between 200° and 450°, in particular those in the range 220° to 270°, a marked improvement in the steepness of the characteristic admittedly takes place at small $\Delta\epsilon/\epsilon\perp$ ratios, but in many cases the so-called d/p window (that is to say the range of the value of the ratio between the layer thickness of the dis-play and the magnitude of the natural pitch, within which, however, no domains are yet obtained . . . (sic) the desired twisting), which are very important for mass production, at the same time become very small or even disappear in some cases. The resulting appearance of domains is not acute in the case of relatively small twist angles (for example 180° in the case of OMI). This is presumably connected with the fact that, with twist angles in the range from 160° to 220°, in particular at 180°, small tilt angles are used which are preferably in the range from 1° to 2°. At higher twist angles (for example in the range 220° to 270°), greater tilt angles (for example in the range from 4° to 6°) are also necessary. It has now been found that the interfering formation of domains at these twist angles can be avoided, if the liquid crystal mixture has an effective content of one or more compounds which have a $K_3/K_1$ value <0.9. These compounds preferably have a dielectric anisotropy of −6 to +2, in particular of −2 to +2, and a clear point below 80°. $K_3/K_1$ is preferably ≦0.8. The content of these compounds in the mixtures according to the invention is preferably 1% to 20%, in particular 5% to 15%. 2-p-n-Alkyl- or 2-p-n-alkoxyphenyl-5-n-alkylpyrimidines, in which the alkyl or alkoxy groups have up to 12 C atoms, are particularly preferred. trans-1-p-n-Alkanoyloxyphenyl-4-n-alkylcyclohexanes, trans, trans-4-n-alkanoyloxy-4-n-alkylcyclohexyl-cyclohexanes and/or p-n-alkylphenyl p-n-alkylbenzoates, wherein the alkanoyloxy or alkyl groups each have up to 12 C atoms, are also preferred. In addition, 2-p-cyanophenyl-5-n-alkylpyrimidines, in which the alkyl group has up to 12 C atoms, are preferred.

In a preferred embodiment, the mixtures according to the invention do not contain any compounds having a dielectric anisotropy $\Delta\epsilon$ of less than −1.5, but, in order to obtain the required $\Delta\epsilon/\epsilon\perp$ values, contain a sufficient proportion of one or more compounds with $\Delta\epsilon > -1.5$ and high values of $\epsilon\perp$. $\Delta\epsilon$ is preferably in the range +3 to +15, in particular +4 to +9, and $\epsilon\perp$ is preferably in the range of 5 to 8.

Preferred compounds of this type are those of the formula I in which $R^2$ is F, Cl, —CN, —NCS, —CF$_3$ or —OCF$_3$. These compounds are the subject of German Patent Applications 3,807,868, 3,807,822, 3,807,806 and 3,807,864.

Moreover, the mixtures according to the invention can in addition also contain highly clarifying additives (clearpoint >180°). The content of these compounds is preferably about 5% to 20%. Suitable compounds are known to those skilled in the art. The compounds given below are particularly preferred:

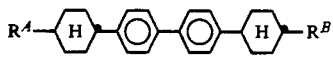

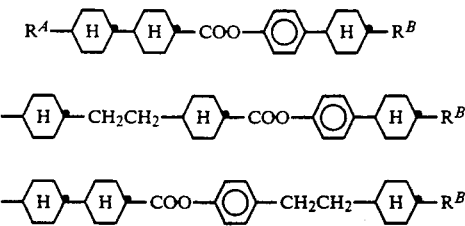

wherein $R^A$ and $R^B$ have the meaning given under the formulae A to G.

The structure of the liquid crystal displays according to the invention from polarisers, electrode base plates and electrodes with such a surface treatment that the preferential orientation (director) of the adjoining liquid crystal molecules from one electrode to the other electrode is in each case twisted usually by an amount of 160° to 450° relative to one another, corresponds to the type of construction which is usual for such displays. The term of the usual type of construction is here used in a wide meaning and also comprises all variations and modifications of the supertwist cell. The surface tilt angles at the two carrier plates can be equal or different. Equal tilt angles are preferred.

The amount of the twist angle of the displays according to the invention is preferably between 160° and 360°, with a particularly preferred amount between 220° and 270°.

However, an essential difference between the displays according to the invention and those hitherto usual on the basis of the twisted nematic cell resides in the choice of the liquid crystal parameters of the liquid crystal layer.

In the displays according to the invention, liquid-crystalline phases are employed in which the liquid crystal parameters $\Delta\epsilon$ and $\Delta\epsilon/\epsilon\perp$ are chosen such that the steepest possible electro-optical characteristic is ensured, together with maximum contrast and minimum dependence on the angle of observation, with a nematic phase range of at least 60° and a viscosity of 30 mPa.s or lower.

The liquid crystal mixtures which can be used according to the invention are prepared in the manner conventional per se. As a rule, the desired quantity of the components used in a smaller amount is dissolved in the components representing the main constituent, advantageously at an elevated temperature. It is also possible to mix solutions of the components in an organic solvent, for example in acetone, chloroform or methanol, and, after thorough mixing, to remove the solvent again, for example by distillation.

All the components of the mixtures according to the invention are known or can be prepared analogously to known compounds by processes known per se.

The dielectrics can also contain further additives which are known to those skilled in the art and have been described in the literature. For example, 0–15% of pleochroic dyes can be added.

The examples which follow are intended to explain the invention without limiting it.

In the examples:
S-N is the smectic/nematic phase transition temperature,
c.p. is the clearpoint, visc. is the viscosity at 20° (mPa.s) (bulk viscosity) and $V_{50}/V_{10}$ is the steepness of the characteristic of an SLC display element at 20°.

Above and below, all temperatures are given in °C. The percentage figures are percent by weight. The physical data always relate to 20° C. The data applying to individual compounds (for example dielectric and elastic data) relate to 20° C.

All values applying to the complete mixture relate to 20° C.

EXAMPLE 1

An SLC display having the following parameters:

| | | |
|---|---|---|
| twist angle | 180° | |
| tilt angle | 1° | |
| d/p (layer thickness/pitch) | 0.35 | |
| d · Δn | 1.06, | | containing a liquid crystal mixture having the following parameters:

| | | |
|---|---|---|
| clearpoint | 84.7° | |
| Δn | 0.1275 (589 nm) | |
| | 0.1257 (633 nm) | |
| viscosity | 23.4 mPa · s | |
| Δε | +8.3 | |
| ε⊥ | 6.0 | | and consisting of
15% of p-trans-4-propylcyclohexyl-benzonitrile,
7% of p-trans-4-butylcyclohexyl-benzonitrile,
8% of 4-ethyl-4'-cyanobiphenyl,
7% of 4-propyl-4'-cyanobiphenyl,
8% of 4-butyl-4'-cyanobiphenyl,
19% of 2,3-difluoro-4-ethoxyphenyl trans-4-pentylcyclohexanecarboxylate,
6% of p-propylphenyl trans-4-(trans-4-propylcyclohexyl)-cyclohexanecarboxylate,
6% of p-pentylphenyl trans-4-(trans-4-propylcyclohexyl)-cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate and
6% of p-trans-4-propylcyclohexylphenyl trans-4-pentylcyclohexanecarboxylate
shows a steepness of the characteristic $V_{50}/V_{10}$ of 3.4%.

EXAMPLE 2

A nematic liquid crystal mixture consisting of
15% of 2,3-difluoro-4-(trans-4-propylcyclohexylethyl)-benzonitrile,
15% of 2,3-difluoro-4-(-trans-4-butylcyclohexylethyl)-benzonitrile,
10% of 2,3-difluoro-4-(trans-4-pentylcyclohexylethyl)-benzonitrile,
9% of trans-4-propylcyclohexyl trans-4-propylcyclohexanecarboxylate,
9% of trans-4-pentylcyclohexyl trans-4-propylcyclohexanecarboxylate,
6% of p-propylphenyl trans-4-(trans-4-propylcyclohexyl)-cyclohexanecarboxylate,
6% of p-pentylphenyl trans-4-(trans-4-propylcyclohexyl)-cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate,
6% of p-trans-4-propylcyclohexylphenyl trans-4-pentylcyclohexanecarboxylate,
3% of 4,4'-bis-(trans-4-propylcyclohexyl)-2-fluorobiphenyl and
3% of 4-(rans-4-pentylcyclohexyl)-4'-(trans-4-propylcyclohexyl)-2-fluorobiphenyl
is prepared.

EXAMPLE 3

A nematic liquid crystal mixture consisting of
15% of p-trans-4-propylcyclohexyl-benzonitrile,
8% of 4-ethyl-2',3'-difluoro-4'-cyanobiphenyl,
7% of 4-propyl-2',3'-difluoro-4'-cyanobiphenyl,
8% of 4-butyl-2',3'-difluoro-4'-cyanobiphenyl,
5% of p-methoxyphenyl trans-4-propylcyclohexanecarboxylate,
4% of p-ethoxyphenyl trans-4-propylcyclohexanecarboxylate,
5% of p-methoxyphenyl trans-4-butylcyclohexanecarboxylate,
4% of p-ethoxyphenyl trans-4-butylcyclohexanecarboxylate,
4% of p-ethoxyphenyl trans-4-pentylcyclohexanecarboxylate,
4% of p-methoxyphenyl trans-4-pentylcyclohexanecarboxylate,
6% of p-propylphenyl trans-4-(trans-4-propylcyclohexyl)cyclohexanecarboxylate,
6% of p-pentylphenyl trans-4-(trans-4-propylcyclohexyl)-cyclohexanecarboxylate,
5% of p-pentylphenyl trans-4-(trans-4-butylcyclohexyl)-cyclohexanecarboxylate,
5% of p-propylphenyl trans-4-(trans-4-butylcyclohexyl)-cyclohexanecarboxylate,
8% of p-propylphenyl p-trans-4-propylcylohexylbenzoate (sic) and
6% of p-propylphenyl p-trans-4-pentylcyclohexylbenzoate
is prepared.

EXAMPLE 4

A nematic liquid crystal mixture consisting of
9% of 4-cyano-2,3-difluorophenyl p-ethylbenzoate,
9% of 4-cyano-2,3-difluorophenyl p-propylbenzoate,
8% of 4-cyano-2,3-difluorophenyl p-pentylbenzoate,
9% trans,trans-4-methoxy-4'-methylcyclohexylcyclohexane,
17% of trans-4-propylcyclohexyl trans-4-propylcyclohexanecarboxylate,
8% of trans-4-pentylcyclohexyl trans-4-propylcyclohexanecarboxylate,
4% of p-trans-4-propylcyclohexylphenyl trans-4-butylcyclohexanecarboxylate,
4% of p-trans-4-propylcyclohexylphenyl trans-4-pentylcyclohexanecarboxylate,
4% of p-propylphenyl trans-4-(trans-4-propylcyclohexyl)-cyclohexanecarboxylate, 4% of p-pentylphenyl trans-4-(trans-4-propylcyclohexyl)-cyclohexanecarboxylate,
4% of p-pentylphenyl trans-4-(trans-4-butylcyclohexyl)-cyclohexanecarboxylate,
4% of p-propylphenyl trans-4-(trans-4-butylcyclohexyl)cyclohexanecarboxylate,
3% of 1-[trans-4-(trans-4-pentylcyclohexyl)-cyclohexyl]-2-(p-propylphenyl)-ethane,
3% of 1-[trans-4-(trans-4-propylcyclohexyl)-cyclohexyl]-2-(p-propylphenyl)-ethane,
3% of 4,4'-bis-(trans-4-propylcyclohexyl)-2-fluorobiphenyl,
3% of 4,4'-bis-(trans-4-pentylcyclohexyl)-2-fluorobiphenyl and
4% of 4-(trans-4-pentylcyclohexyl)-4'-(trans-4-propylcyclohexyl)-2-fluorobiphenyl
is prepared.

EXAMPLE 5

An SLC display having the following parameters:

| twist angle | 180° |
| --- | --- |
| tilt angle | 1° |
| d/p (layer thickness/pitch) | 0.35 |
| d · Δn | 1.0 | containing a liquid crystal mixture having the following parameters:

| clearpoint | 85° |
| --- | --- |
| Δn | 0.141 |
| viscosity | 22.4 mPa · s |
| Δε | +7.2 |
| ε⊥ | 5.5 |
| $K_3/K_1$ | 1.42 | and consisting of
9% of p-trans-4-propylcyclohexyl-benzonitrile,
7% of 4-ethyl-4'-cyanobiphenyl,
7% of 4-propyl-4'-cyanobiphenyl,
7% of 4-butyl-4'-cyanobiphenyl,
5% of p-fluorophenyl trans-4-propylcyclohexanecarboxylate,
4% of p-methoxyphenyl trans-4-propylcyclohexanecarboxylate,
4% of p-ethoxyphenyl trans-4-propylcyclohexanecarboxylate,
4% of p-ethoxyphenyl trans-4-butylcyclohexanecarboxylate,
4% of p-methoxyphenyl trans-4-butylcyclohexanecarboxylate,
13% of 2,3-difluoro-4-ethoxy-4'-pentyl-tolane,
5% of p-propylphenyl trans-4-(trans-4-propylcyclohexyl)-cyclohexanecarboxylate,
5% of p-pentylphenyl trans-4-(trans-4-propylcyclohexyl)-cyclohexancarboxylate,
5% of p-fluorophenyl trans-4-(trans-4-propylcyclohexyl)-cyclohexanecarboxylate,
5% of p-fluorophenyl trans-4-(trans-4-pentylcyclohexyl)-cyclohexanecarboxylate,
4% of 2,3,4-trifluorophenyl trans-4-(trans-4-pentylcyclohexyl)-cyclohexanecarboxylate,
6% of p-trans-4-propylcyclohxxylphenyl trans-4-butylcyclohexanecarboxylate and
6% of p-trans-4-propylcyclohexylphenyl trans-4-pentylcyclohexanecarboxylate
shows a steepness of the characteristic $V_{50}/V_{10}$ of 3.4%.

The chiral doping material used in each case was S-811 [2-octyl p-(p-n-hexylbenzoyloxyphenyl)-benzoate].

EXAMPLE 6

An SLC display having the following parameters:

| twist angle | 220° |
| --- | --- |
| tilt angle | 1° |
| d/p (layer thickness/pitch) | 0.36 |
| d · Δn | 0.85, | containing a liquid crystal mixture having the following parameters:

| clearpoint | 94° |
| --- | --- |
| Δn | 0.1238 (589 nm) |
| viscosity | 25 mPa · s |
| Δε | +7.5 |
| ε⊥ | 5.9 | and consisting of
15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
7% of 2,3-difluoro-4-ethoxyphenyl trans-4-propylcyclohexanecarboxylate,
6% of 2,3-difluoro-4-ethoxyphenyl trans-4-pentylcyclohexanecarboxylate,
7% of 2,3-difluoro-4-ethoxyphenyl trans,trans-4-propylcyclohexylcyclohexane-4'-carboxylate,
5% of 4-(trans-4-propylcyclohexyl)-2',3'-difluoro-4'-ethoxy-tolan,
5% of 4-(trans-4-pentylcyclohexyl)-2',3'-difluoro-4'-ethoxy-tolan,
6% of 1-[trans-4-(trans-4-propylcyclohexyl)-cyclohexyl]-2-(p-methylphenyl)-ethane,
6% of 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane,
4% of 1-[trans-4-(trans-4-propylcyclohexyl)-cyclohexyl]-2-(p-cyanophenyl)-ethane and
6% of 1-[trans-4-(trans-4-propylcyclohexyl)-cyclohexyl]-2-(p-fluorophenyl)-ethane
shows a steepness of the characteristic $V_{50}/V_{10}$ of 2.7%.

In an SLC display with a greater tilt angle (5°), d/p=0.40, d.Δn=0.85 and 220° twist angle, the same mixture shows a steepness $V_{50}/V_{10}$ of 2.9% and a value β of 0.4% for the angle dependence of the contrast.

EXAMPLE 7

An SLC display having the following parameters:

| twist angle | 220° |
| --- | --- |
| tilt angle | 1° |
| d/p (layer thickness/pitch) | 0.4° |
| d · Δn | 0.85, | containing a liquid crystal mixture having the following parameters:

| | |
|---|---|
| clearpoint | 91° |
| Δn | 0.1085 (589 nm) |
| viscosity | 25 mPa · s |
| Δε | +8.2 |
| ε⊥ | 5.1 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 7% of 2,3-difluoro-4-ethoxyphenyl trans-4-propylcyclohexanecarboxylate,
- 6% of 2,3-difluoro-4-ethoxyphenyl trans-4-pentylcyclohexanecarboxylate,
- 7% of 2,3-difluoro-4-ethoxyphenyl trans,trans-4-propylcyclohexylcyclohexane-4'-carboxylate,
- 8% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane, 8% of 1-[trans-4-(trans-4-propylcyclohexyl)-cyclohexyl]-2-(p-pentylphenyl)-ethane,
- 8% of 1-[trans-4-(trans-4-propylcyclohexyl)-cyclohexyl]-2-(p-cyanophenyl)-ethane and
- 8% of 1-[trans-4-(trans-4-propylcyclohexyl)-cyclohexyl]-2-(p-fluorophenyl)-ethane shows a steepness of the characteristic $V_{50}/V_{10}$ of 2.2%.

EXAMPLE 8

An SLC display having the following parameters:

| | |
|---|---|
| twist angle | 220° |
| tilt angle | 1° |
| d/p (layer thickness/pitch) | 0.41 |
| d · Δn | 0.85, | containing a liquid crystal mixture having the following parameters:

| | |
|---|---|
| clearpoint | 88° |
| Δn | 0.1569 (589 nm) |
| viscosity | 22 mPa · s |
| Δε | +7.8 |
| ε⊥ | 5.9 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 9% of 4-propyl-2',3'-difluoro-4'-ethoxy-tolan,
- 9% of 4-pentyl-2',3'-difluoro-4'-ethoxy-tolan,
- 6% of 4-(trans-4-propylcyclohexyl)-2',3'-difluoro-4'-ethoxy-tolan,
- 6% of 4-(trans-4-pentylcyclohexyl)-2',3'-difluoro-4'-ethoxy-tolan,
- 6% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane,
- 6% of 1-[trans-4-(trans-4-propylcyclohexyl)-cyclohexyl]-2-(p-pentylphenyl)-ethane,
- 4% of 1-[trans-4-(trans-4-propylcylcohexyl)-cyclohexyl]-2-(p-cyanophenyl)-ethane (sic) and
- 6% of 1-[trans-4-(trans-4-propylcyclohexyl)-cyclohexyl]-2-(p-fluorophenyl)-ethane shows a steepness of the characteristic $V_{50}/V_{10}$ of 3.7%.

EXAMPLE 9

An SLC display of the following parameters:

| | |
|---|---|
| twist angle | 220° |
| tilt angle | 1° |
| d/p (layer thickness/pitch) | 0.42 |
| d · Δn | 0.85 | containing a liquid crystal mixture having the following parameters:

| | |
|---|---|
| clearpoint | 94° |
| Δn | 0.1420 (589 nm) |
| viscosity | 23 mPa · s |
| Δε | +8.3 |
| ε⊥ | 5.0 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 12% of 4-pentyl-2',3'-difluoro-4'-ethoxy-tolan,
- 5% of 4-(trans-4-propylcyclohexyl)-2',3'-difluoro-4'-ethoxy-tolan,
- 6% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane,
- 6% of 1-[trans-4-(trans-4-propylcyclohexyl)-cyclohexyl]-2-(p-pentylphenyl)-ethane,
- 4% of 1-[trans-4-(trans-4-propylcyclohexyl)-cyclohexyl-]2-(p-cyanophenyl)-ethane and
- 6% 1-[trans-4-(trans-4-propylcyclohexyl)-cyclohexyl]-2-(p-fluorophenyl)-ethane shows a steepness of the characteristic $V_{50}/V_{10}$ of 3.6%.

EXAMPLE 10

An SLC display of the following parameters:

| | |
|---|---|
| twist angle | 220° |
| tilt angle | 1° |
| d/p (layer thickness/pitch) | 0.44 |
| d · Δn | 0.85, | containing a liquid crystal mixture having the following parameters:

| | |
|---|---|
| clearpoint | 92° |
| Δn | 0.1250 (589 nm) |
| viscosity | 21 mPa · s |
| Δε | +8.2 |
| ε⊥ | 4.3 | and consisting of
- 15% of p-trans-4-propylcylcohexyl-benzonitrile (sic),
- 11% of p-trans-4-butylcyclohexyl-benzonitrile, 11% of p-trans-4-pentylcyclohexyl-benzonitrile,
5% of p-trans-4-ethylcyclohexyl-benzonitrile,
10% of 4-pentyl-2',3'-difluoro-4-ethoxy-tolan,
8% of 1-[trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane,
8% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-2-(p-cyanophenyl)-ethane and
8% of 1-[trans-4-(trans-4-propylcyclohexyl)-cyclohexyl]-2-(p-fluorophenyl)-ethane shows a steepness of the characteristic $V_{50}/V_{10}$ of 4.0%.

EXAMPLE 11

An SLC display having the following parameters:

| | |
|---|---|
| twist angle | 22° |
| tilt angle | 1° |
| d/p (layer thickness/pitch) | 0.37 |
| d · Δn | 0.85, | containing a liquid crystal mixture having the following parameters:

| | |
|---|---|
| clearpoint | 88° |
| Δn | 0.1544 (589 nm) |
| viscosity | 26 mPa · s |
| Δε | +7.3 |
| ε⊥ | 6.4 | and consisting of
15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
7% of 2,3-difluoro-4-ethoxyphenyl trans-4-propylcyclohexanecarboxylate,
6% of 2,3-difluoro-4-ethoxyphenyl trans-4-butylcyclohexanecarboxylate,
7% of 2,3-difluoro-4-ethoxyphenyl trans-4-pentylcyclohexanecarboxylate,
6% of 4-propyl-2',3'-difluoro-4'-ethoxy-tolan,
4% of 4-(trans-4-propylcyclohexyl)-2',3'-difluoro-4'-ethoxy-tolan,
6% of 4-(trans-4-propylcyclohexyl)-4'-methoxy-tolan,
5% of 4-(trans-4-propylcyclohexyl)-4'-ethoxy-tolan,
7% of 4-(trans-4-propylcyclohexyl)-4'-propoxy-tolan,
6% of 1-[trans-(trans-4-propylcyclohexyl)-cyclohexyl]-2-(p-methylphenyl)-ethane and
4% of 1-[trans-(trans-4-propylcyclohexyl)-cyclohexyl]-2-(p-propylphenyl)-ethane shows a steepness of the characteristic $V_{50}/V_{10}$ of 2.7 and an angle dependence of the contrast of $\beta=0.9\%$.

EXAMPLE 12

An SLC display of the following parameters:

| | |
|---|---|
| twist angle | 220° |
| tilt angle | 1° |
| d/p (layer thickness/pitch) | 0.45 |
| d · Δn | 0.85 | containing a liquid crystal mixture having the following parameters:

| | |
|---|---|
| clearpoint | 78° |
| Δn | 0.1206 (589 nm) |
| viscosity | 25 mPa · s |
| Δε | +7.0 |
| ε⊥ | 5.3 | and consisting of
15% of p-trans-4-propylcyclohexyl-benzonitrile,
11% of p-trans-4-butylcyclohexyl-benzonitrile,
9% of p-trans-4-pentylcyclohexyl-benzonitrile,
6% of 2,3-difluoro-4-ethoxyphenyl trans-4-pentylcyclohexanecarboxylate,
7% of 2,3-difluoro-4-ethoxyphenyl trans-4-propylcyclohexanecarboxylate,
7% of 2,3-difluoro-4-ethoxyphenyl trans-4-(trans-4-propylcyclohexyl)-cyclohexanecarboxylate,
7% of 2-p-methoxyphenyl-5-hexylpyrimidine,
7% of 2-p-pentyloxyphenyl-5-hexylpyrimidine,
7% of 2-p-heptyloxyphenyl-5-hexylpyrimidine,
6% of 1-(trans-4-(trans-4-propylcyclohexyl)-cyclohexyl)-2-(p-methylphenyl)-ethane,
6% of 1-(trans-4-(trans-4-propylcyclohexyl)-cyclohexyl)-2-(p-propylphenyl)-ethane,
6% of 1-(trans-4-(trans-4-propylcyclohexyl)-cyclohexyl)-2-(p-pentylphenyl)-ethane and
6% of 1-(trans-4-(trans-4-propylcyclohexyl)-cyclohexyl)-2-(p-cyanophenyl)-ethane shows a steepness of the characteristic $V_{90}/V_{10}$ of 7.5% and a d/p window of 0.42–0.53.

EXAMPLE 13

A nematically liquid crystal mixture consisting of
15% of 2,3-difluoro-4-(trans-4-propylcyclohexylethyl)-benzonitrile,
15% of 2,3-difluoro-4-(trans-4-butylcyclohexylethyl)-benzonitrile,
10% of 2,3-difluoro-4-(trans-4-pentylcyclohexylethyl)-benzonitrile,
9% of 2-fluoro-4-propylphenyl trans-4-propylcyclohexanecarboxylate,
9% of trans-4-pentylcyclohexyl trans-4-propylcyclohexanecarboxylate,
6% of p-propylphenyl trans-4-(trans-4-propylcyclohexyl)-cyclohexanecarboxylate,
6% of p-pentylphenyl trans-4-(trans-4-propylcyclohexyl)-cyclohexanecarboxylate,
6% of p-pentylphenyl trans-4-(trans-4-butylcyclohexyl)-cyclohexanecarboxylate,
6% of p-propylphenyl trans-4-(trans-4-butylcyclohexyl)-cyclohexanecarboxylate,
6% of p-trans-4-propylcyclohexylphenyl trans-4-butylcyclohexanecarboxylate,
6% of p-trans-4-propylcyclohexylphenyl trans-4-pentylcyclohexanecarboxylate,
3% of 4,4'-bis-(trans-4-propylcyclohexyl)-2-fluorobiphenyl and
3% of 4-(trans-4-pentylcyclohexyl)-4'-(trans-4-propylcyclohexyl)-2-fluorobiphenyl
is prepared.

EXAMPLE 14

A nematic liquid crystal mixture consisting of
9% of 4-cyano-2,3-difluorophenyl p-ethylbenzoate,
9% of 4-cyano-2,3-difluorophenyl p-propylbenzoate,
8% of 4-cyano-2,3-difluorophenyl p-pentylbenzoate,
9% of trans,trans-4-methoxy-4'-methylcyclohexylcyclohexane,
17% of trans-4-propylcyclohexyl trans-4-propylcyclohexanecarboxylate,
8% of trans-4-pentylcyclohexyl trans-4-propylcyclohexanecarboxylate,
4% of p-trans-4-propylcyclohexylphenyl trans-4-butylcyclohexanecarboxylate,
4% of p-trans-4-propylcyclohexylphenyl trans-4-pentylcyclohexanecarboxylate,
4% of p-propylphenyl trans-4-(trans-4-propylcyclohexyl)-cyclohexanecarboxylate,
4% of p-pentylphenyl trans-4-(trans-4-propylcyclohexyl)-cyclohexanecarboxylate,
4% of p-pentylphenyl trans-4-(trans-4-butylcyclohexyl)-cyclohexanecarboxylate,
4% of p-propylphenyl trans-4-(trans-4-butylcyclohexyl)-cyclohexanecarboxylate,
3% of 1-[p-(trans-4-pentylcyclohexyl)-phenyl]-2-(p-propylphenyl)-ethane,
3% of 1-[trans-4-(trans-4-propylcyclohexyl)-cyclohexyl]-2-(p-propylphenyl)-ethane,
3% of 4,4'-bis-(trans-4-propylcyclohexyl)-2-fluorobiphenyl,
3% of 4,4'-bis-(trans-4-pentylcyclohexyl)-2-fluorobiphenyl
and
4% of 4-(trans-4-pentylcyclohexyl)-4'-(trans-4-propylcyclohexyl)-2-fluorobiphenyl
is prepared.

EXAMPLE 15

A liquid crystal mixture consisting of
9% of p-trans-4-propylcyclohexyl-benzonitrile,
7% of 4-ethyl-4'-cyanobiphenyl,
7% of 4-propyl-4'-cyanobiphenyl,
7% of 4-butyl-4'-cyanobiphenyl,
5% of p-fluorophenyl trans-4-propylcyclohexanecarboxylate,
4% p-methoxyphenyl trans-4-propylcyclohexanecarboxylate,
4% of p-ethoxyphenyl trans-4-propylcyclohexanecarboxylate,
4% of p-ethoxyphenyl trans-4-butylcyclohexanecarboxylate,
4% of p-methoxyphenyl trans-4-butylcyclohexanecarboxylate,
13% of 4-ethoxy-4'-pentyl-tolane,
5% of p-propylphenyl trans-4-(trans-4-propylcyclohexyl)-cyclohexanecarboxylate,
5% of p-pentylphenyl trans-4-(trans-4-propylcyclohexyl)-cyclohexanecarboxylate,
5% of p-fluorophenyl trans-4-(trans-4-propylcyclohexyl)-cyclohexanecarboxylate,
5% of p-fluorophenyl trans-4-(trans-4-pentylcyclohexyl)-cyclohexanecarboxylate,
4% of 2,3,4-trifluorophenyl trans-4-(trans-4-pentylcyclohexyl)-cyclohexanecarboxylate,
6% of p-trans-4-propylcyclohexylphenyl trans-4-butylcyclohexanecarboxylate and
6% of p-trans-4-propylcyclohexylphenyl trans-4-pentylcyclohexanecarboxylate
is prepared.

EXAMPLE 16

A liquid crystal mixture consisting of
15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
7% of 2,3-difluoro-4-ethoxyphenyl trans-4-propylcyclohexanecarboxylate,
6% of 2,3-difluoro-4-ethoxyphenyl trans-4-pentylcyclohexanecarboxylate,
7% of 2,3-difluoro-4-ethoxyphenyl trans,trans-4-propylcyclohexylcyclohexane-4'-carboxylate,
5% of 4-(trans-4-propylcyclohexyl)-2',3'-difluoro-4'-ethoxy tolane,
5% of 2-(2,3-difluoro-4-ethoxyphenyl)-5-heptyl-pyrimidine,
6% of 1-[trans-4-(trans-4-propylcyclohexyl)-cyclohexyl]-2-(p-methylphenyl)-ethane,
6% 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane,
4% of 1-[trans-4-(trans-4-propylcyclohexyl)-cyclohexyl]-2-(p-cyanophenyl)-ethane and
6% of 1-[trans-4-(trans-4-propylcyclohexyl)-cyclohexyl]-2-(p-fluorophenyl)-ethane
is prepared.

EXAMPLE 17

A liquid crystal mixture consisting of
15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
7% of 2,3-difluoro-4-ethoxyphenyl trans-4-propylcyclohexanecarboxylate,
6% of 2,3-difluoro-4-ethoxyphenyl trans-4-butylcyclohexanecarboxylate,
7% of 2,3-difluoro-4-ethoxyphenyl trans-4-pentylcyclohexanecarboxylate,
6% of 4-propyl-2',3'-difluoro-4'-ethoxy-tolane,
4% of 4-(trans-4-propylcyclohexyl)-2',3'-difluoro-4'-ethoxy-tolane,
6% of 4-(trans-4-propylcyclohexylethyl)-4'-methoxytolane,
5% of 4-(trans-4-propylcyclohexyl)-4'-ethoxy-tolane,
7% of 4-(trans-4-propylcyclohexyl)-4'-propoxy-tolane,
6% of 1-[trans-(trans-4-propylcyclohexyl)-cyclohexyl]-2-(p-methylphenyl)-ethane and
4% of 1-[trans-(trans-4-propylcyclohexyl)-cyclohexyl]-2-(p-propylphenyl)-ethane
is prepared.

The chiral doping substance used was in each case S-811 [2-octyl p-(p-n-hexylbenzoyloxyphenyl)-benzoate].

We claim:
1. A supertwist liquid crystal display comprising:
two plane-parallel carrier plates which, with a border, form a cell;
a nematic liquid crystal mixture, located in the cell, having a positive dielectric anisotropy and at least one chiral doping material;
electrode layers with superposed orientation layers on the insides of the carrier plates;

a tilt angle of 1° to 30° between the longitudinal axis of the molecules at the surface of the carrier plates and the carrier plates; and a twist angle of the liquid crystal mixture in the cell from orientation layer to orientation layer of between 160° and 450°, wherein the nematic liquid crystal mixture satisfies the following conditions:

a nematic phase range of at least 60° C., a viscosity of 30 mPa.s or lower, and $0.9 \leq \Delta\epsilon/\epsilon\perp \leq 2.0$, where $\Delta\epsilon$ is the dielectric anisotropy and $\epsilon\perp$ is the dielectric constant in the direction of the short axis of the liquid crystal molecule, and wherein the liquid crystal mixture contains at least one compound of the following formulae R and/or S:

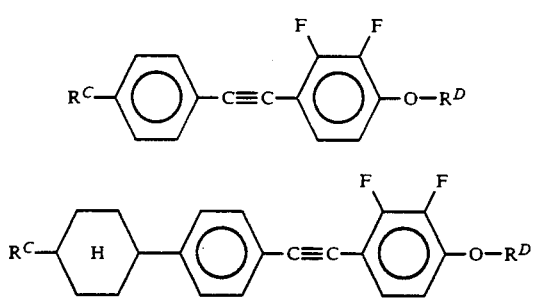

wherein $R^C$ and $R^D$ each independently of one another are n-alkyl having 1–10 C atoms or (trans)-n-alkenyl having 3–10 C atoms.

2. A display according to claim 1, wherein said display has a product of birefringence $\Delta n$ and the layer thickness of the liquid crystal mixture is between 0.1 $\mu m$ and 2.5 $\mu m$.

3. A display according to claim 1, wherein the dielectric constant $\epsilon\perp$ is greater than or equal to 4.

4. A display according to claim 1, wherein the dielectric anisotropy $\Delta\epsilon$ is greater than or equal to 5.

5. A display according to claim 1, wherein the dielectric constant $\epsilon\perp$ is greater than or equal to 5.

6. A display according to claim 1, wherein the liquid crystal mixture also contains at least one liquid-crystalline compound with the structural element

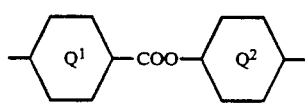

wherein $Q^1$ and $Q^2$ independently of one another are trans-1,4-cyclohexylene, 1,4-phenylene, 2-fluoro-1,4-phenylene, 3-fluoro-1,4-phenylene or 2,3-difluoro-1,4-phenylene.

7. A display according to claim 6, wherein the liquid crystal mixture contains at least one compound of the following formulae A to G:

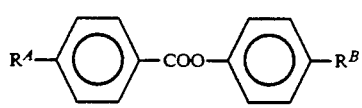

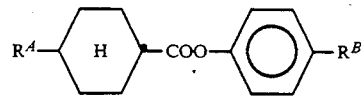

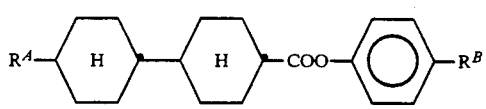

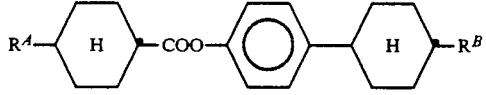

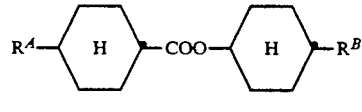

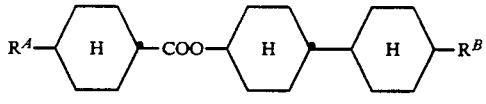

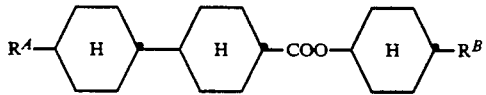

wherein $R^A$ and $R^B$ each independently of one another are alkyl having 1 to 15 C atoms or alkenyl having 3 to 15 C atoms, it also being possible for one $CH_2$ group in each of these radicals to be replaced by —O—, —CO—, —CO—O— or —O—CO—.

8. A display according to claim 6, wherein the liquid crystal mixture contains at least one compound of the following formulae H to K:

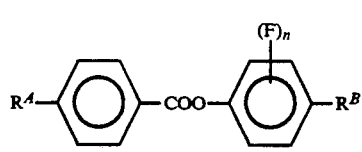

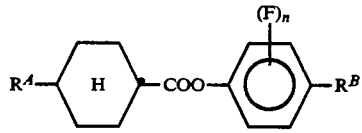

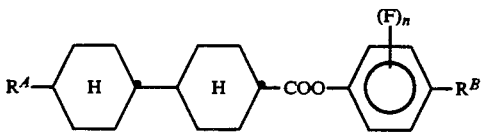

wherein n is 1 or 2 and, in the case of n=2, the two fluorine atoms are adjacent, and $R^A$ and $R^B$ have the meaning given in claim 9.

9. A display according to claim 1, wherein the liquid crystal mixture also contains at least one liquid-crystalline compound with the structural element

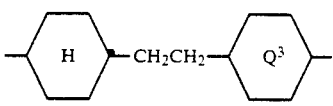

wherein $Q^3$ is trans-1,4-cyclohexylene, 1,4-phenylene, 2-fluoro-1,4-phenylene, 3-fluoro-1,4-phenylene or 2,3-difluoro-1,4-phenylene.

10. A display according to claim 6, wherein the liquid crystal mixture contains at least one compound of the following formulae E1 to E7

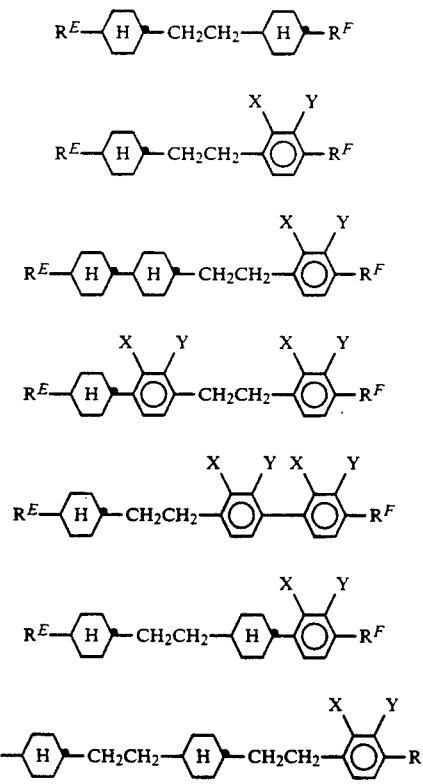

wherein in each case $R^E$ is n-alkyl having 1 to 10 C atoms or (trans)-n-alkenyl having 3 to 10 C atoms, $R^F$ is n-alkyl having 1 to 10 C atoms, n-alkoxy having 1 to 10 C atoms, (trans)-n-alkenyl having 3 to 10 C atoms, F or CN, and X and Y each independently of one another are H or F.

11. A display according to claim 7, wherein the liquid crystal mixture contains at least one compound of the formulae E3 to E7.

12. A display according to claim 8, wherein in at least one compound of the formulae E3 to E7, $R^F$ is n-alkyl or n-alkenyl and X and Y are each H.

13. A display according to claim 8, wherein in at least one compound of the formulae E3 to E7, $R^F$ is fluorine, X is H and Y is H or fluorine.

14. A display according to claim 11, wherein in at least one compound of the formulae E3 to E7, $R^R$ is cyano.

15. A method of enhancing the steepness of the electrooptical characteristic curve of a supertwist liquid crystal display comprising employing as the nematic liquid crystal mixture of said display one which satisfies the following conditions:

a nematic phase range of at least 60° C.,
a viscosity of 30 mPa.s or lower, and
$0.9 \leq \Delta\epsilon/\epsilon\perp \leq 2.0$, where $\Delta\epsilon$ is the dielectric anisotropy and $\epsilon\perp$ is the dielectric constant in the direction of the short axis of the liquid crystal molecules, whereby high steepness of the characteristic curve is achieved, said display further comprising:

two plane-parallel carrier plates which, with a border, form a cell;
a nematic liquid crystal mixture, located in the cell, having a positive dielectric anisotropy and at least one chiral doping material;
electrode layers with superposed orientation layers on the insides of the carrier plates;
a tilt angle of about 1° to 30° between the longitudinal axis of the molecules at the surface of the carrier plates and the carrier plates;
a twist angle of the liquid crystal mixture in the cell from orientation layer to orientation layer of between 160° and 450°, and wherein the liquid crystal mixture contains at least one compound of the following formulae R and/or S:

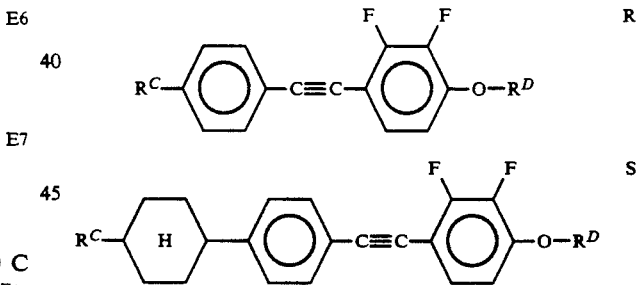

wherein $R^C$ and $R^D$ each independently of one another are n-alkyl having 1–10 C atoms or (trans)-n-alkenyl having 3–10 C atoms.

16. A display of claim 1, wherein said steepness is such that the ratio $V_{50}/V_{10}$ of said display is at least 2.2

17. A method of claim 15, wherein said steepness is such that the ratio $V_{50}/V_{10}$ of said display is at least 2.2.

* * * * *